(12) United States Patent
Scott et al.

(10) Patent No.: US 10,773,976 B2
(45) Date of Patent: Sep. 15, 2020

(54) METHOD OF TREATMENT USING A SOLID PARTICULATE MATERIAL AND APPARATUS THEREFOR

(71) Applicant: Xeros Limited, Rotherham, South Yorkshire (GB)

(72) Inventors: Iain Alexander Scott, Rotherham (GB); Thomas John Wallace, Rotherham (GB); Siân Catherine Tedds, Rotherham (GB)

(73) Assignee: Xeros Limited, Rotherham, South Yorkshire (GB)

( * ) Notice: Subject to any disclaimer, the term of this patent is extended or adjusted under 35 U.S.C. 154(b) by 44 days.

(21) Appl. No.: 16/093,398

(22) PCT Filed: Apr. 13, 2017

(86) PCT No.: PCT/GB2017/051049
§ 371 (c)(1),
(2) Date: Oct. 12, 2018

(87) PCT Pub. No.: WO2017/178832
PCT Pub. Date: Oct. 19, 2017

(65) Prior Publication Data
US 2019/0210892 A1 Jul. 11, 2019

(30) Foreign Application Priority Data
Apr. 13, 2016 (GB) .................................. 1606402.4

(51) Int. Cl.
C02F 1/38 (2006.01)
C14C 15/00 (2006.01)
C02F 103/24 (2006.01)

(52) U.S. Cl.
CPC ................ C02F 1/38 (2013.01); C14C 15/00 (2013.01); *C02F 2103/24* (2013.01)

(58) Field of Classification Search
USPC ................... 210/787, 512.1; 8/94.15; 134/10; 68/142, 3 R
See application file for complete search history.

(56) References Cited

U.S. PATENT DOCUMENTS

| | | | |
|---|---|---|---|
| 8,959,961 | B2 | 2/2015 | Jenkins et al. |
| 8,974,545 | B2 | 3/2015 | Burkinshaw et al. |
| 9,017,423 | B2 | 4/2015 | Burkinshaw et al. |
| 9,121,000 | B2 | 9/2015 | Burkinshaw et al. |
| 9,127,882 | B2 | 9/2015 | Jenkins et al. |
| 9,297,107 | B2 | 3/2016 | Jenkins |
| 9,315,766 | B2 | 4/2016 | He et al. |
| 9,404,210 | B2 | 8/2016 | He et al. |

(Continued)

FOREIGN PATENT DOCUMENTS

| | | |
|---|---|---|
| CN | 102061589 A | 5/2011 |
| CN | 202175862 U | 3/2012 |

(Continued)

OTHER PUBLICATIONS

U.S. Appl. No. 16/093,433, Xeros Ltd.

(Continued)

*Primary Examiner* — Claire A Norris
(74) *Attorney, Agent, or Firm* — Clark & Elbing LLP (57) ABSTRACT

A method of treating a substrate with a solid particulate material and a treatment liquor comprising: agitating the substrate with said solid particulate material and said treatment liquor; and (a) separating the substrate from effluent comprising solid waste fragments derived from the substrate, said solid particulate material and the treatment liquor; (b) transferring said effluent to a hydrocyclone separator comprising an inlet, a first outlet and a second outlet, wherein the effluent is fed into the hydrocyclone separator via the inlet; (c) separating the effluent in the hydrocyclone separator to produce a first stream and a second stream, wherein the first stream comprises said solid particulate material and exits the hydrocyclone separator via the first outlet and wherein the second stream comprises treatment liquor and solid waste fragments and exits the hydrocyclone separator via the second outlet; and (d) collecting the first (Continued)

stream after it exits the hydrocyclone separator via the first outlet.

38 Claims, 3 Drawing Sheets

(56) References Cited

U.S. PATENT DOCUMENTS

| | | | |
|---|---|---|---|
| 9,410,278 B2 | 8/2016 | He et al. |
| 9,476,155 B2 | 10/2016 | He et al. |
| 9,487,898 B2 | 11/2016 | He et al. |
| 9,523,169 B2 | 12/2016 | Sawford et al. |
| 9,550,966 B2 | 1/2017 | Burkinshaw et al. |
| 9,587,337 B2 | 3/2017 | He et al. |
| 9,587,340 B2 | 3/2017 | Jenkins et al. |
| 9,631,314 B2 | 4/2017 | Yin et al. |
| 9,803,307 B2 | 10/2017 | Jenkins et al. |
| 9,834,881 B2 | 12/2017 | Sawford et al. |
| 9,845,516 B2 | 12/2017 | Steele |
| 9,850,455 B2 | 12/2017 | Jenkins et al. |
| 9,850,619 B2 | 12/2017 | Wells et al. |
| 9,914,901 B2 | 3/2018 | Burkinshaw et al. |
| 9,932,700 B2 | 4/2018 | Wells et al. |
| 10,017,895 B2 | 7/2018 | Wells et al. |
| 10,081,900 B2 | 9/2018 | Wells et al. |
| 10,287,642 B2 | 5/2019 | Scott |
| 10,301,691 B2 | 5/2019 | Feyisa et al. |
| 10,316,448 B2 | 6/2019 | He et al. |
| 10,494,590 B2 | 12/2019 | Abercrombie et al. |
| 10,590,499 B2 | 3/2020 | Ashfaq et al. |
| 10,597,814 B2 | 3/2020 | Wells et al. |
| 2005/0109715 A1 | 5/2005 | Stoy et al. |
| 2011/0296628 A1* | 12/2011 | Jenkins .............. D06F 35/00 8/137 |
| 2012/0048299 A1 | 3/2012 | Jenkins et al. |
| 2013/0167882 A1 | 7/2013 | Burkinshaw et al. |
| 2014/0201929 A1 | 7/2014 | He et al. |
| 2014/0317860 A1 | 10/2014 | He et al. |
| 2015/0027173 A1 | 1/2015 | Wu et al. |
| 2015/0096128 A1 | 4/2015 | Sawford et al. |
| 2015/0096129 A1* | 4/2015 | Sawford ............. D06F 39/081 8/137 |
| 2015/0152357 A1 | 6/2015 | Abercrombie et al. |
| 2015/0175945 A1 | 6/2015 | Waddon et al. |
| 2015/0252511 A1 | 9/2015 | Roberts et al. |
| 2016/0040260 A1 | 2/2016 | Steele |
| 2016/0195409 A1 | 7/2016 | Goldberg et al. |
| 2016/0197998 A1 | 7/2016 | Carleo |
| 2016/0251602 A1 | 9/2016 | Steele et al. |
| 2016/0251603 A1 | 9/2016 | Steele et al. |
| 2017/0051447 A1 | 2/2017 | He et al. |
| 2017/0137983 A1 | 5/2017 | He et al. |
| 2017/0159222 A1 | 6/2017 | Jenkins et al. |
| 2017/0240980 A1 | 8/2017 | Feyisa et al. |
| 2017/0240981 A1 | 8/2017 | Scott |
| 2017/0240982 A1 | 8/2017 | Sadeghi |
| 2017/0241061 A1 | 8/2017 | Wells et al. |
| 2017/0247771 A1 | 8/2017 | Scott |
| 2017/0267949 A1 | 9/2017 | Bird et al. |
| 2018/0057777 A1 | 3/2018 | Waddon et al. |
| 2018/0127914 A1 | 5/2018 | Wells et al. |
| 2018/0134994 A1 | 5/2018 | Steele et al. |
| 2018/0141089 A1 | 5/2018 | Sawford et al. |
| 2018/0216049 A1 | 8/2018 | Bird et al. |
| 2019/0144959 A1 | 5/2019 | Ashfaq et al. |
| 2019/0211288 A1 | 7/2019 | Potts et al. |
| 2019/0233760 A1 | 8/2019 | Lavery et al. |
| 2020/0002650 A1 | 1/2020 | Servin et al. |

FOREIGN PATENT DOCUMENTS

| | | |
|---|---|---|
| CN | 102425053 A | 4/2012 |
| CN | 102425055 A | 4/2012 |
| CN | 202214631 U | 5/2012 |
| CN | 202214633 U | 5/2012 |
| CN | 202298219 U | 7/2012 |
| CN | 202298220 U | 7/2012 |
| CN | 202298222 U | 7/2012 |
| CN | 202323458 U | 7/2012 |
| CN | 202359387 U | 8/2012 |
| CN | 202359388 U | 8/2012 |
| CN | 202359389 U | 8/2012 |
| CN | 202359390 U | 8/2012 |
| CN | 202359396 U | 8/2012 |
| CN | 202492706 U | 10/2012 |
| CN | 202543634 U | 11/2012 |
| CN | 202543635 U | 11/2012 |
| CN | 202543646 U | 11/2012 |
| CN | 202543652 U | 11/2012 |
| CN | 102899848 A | 1/2013 |
| CN | 202688698 U | 1/2013 |
| CN | 202755220 U | 2/2013 |
| CN | 202755221 U | 2/2013 |
| CN | 102953249 A | 3/2013 |
| CN | 102953250 A | 3/2013 |
| CN | 102953262 A | 3/2013 |
| CN | 102978870 A | 3/2013 |
| CN | 103061084 A | 4/2013 |
| CN | 103061085 A | 4/2013 |
| CN | 103061086 A | 4/2013 |
| CN | 103061087 A | 4/2013 |
| CN | 103087839 A | 5/2013 |
| CN | 103103720 A | 5/2013 |
| CN | 103103721 A | 5/2013 |
| CN | 103122566 A | 5/2013 |
| CN | 103122567 A | 5/2013 |
| CN | 202913242 U | 5/2013 |
| CN | 103225192 A | 7/2013 |
| CN | 203049283 U | 7/2013 |
| CN | 103361934 A | 10/2013 |
| CN | 103361938 A | 10/2013 |
| CN | 203370359 U | 1/2014 |
| CN | 102061588 B | 2/2014 |
| CN | 103556439 A | 2/2014 |
| CN | 203530695 U | 4/2014 |
| CN | 203530700 U | 4/2014 |
| CN | 203530714 U | 4/2014 |
| CN | 203530718 U | 4/2014 |
| CN | 203530723 U | 4/2014 |
| CN | 203530725 U | 4/2014 |
| CN | 103285643 B | 4/2015 |
| CN | 103451894 B | 11/2015 |
| CN | 103556434 B | 11/2015 |
| CN | 103556436 B | 11/2015 |
| CN | 103556431 B | 1/2016 |
| CN | 103556432 B | 3/2016 |
| CN | 105420992 A | 3/2016 |
| CN | 105420993 A | 3/2016 |
| CN | 105421000 A | 3/2016 |
| CN | 105442267 A | 3/2016 |
| CN | 205329373 U | 6/2016 |
| CN | 205329374 U | 6/2016 |
| CN | 205329380 U | 6/2016 |
| CN | 205329384 U | 6/2016 |
| EP | 2881369 A1 | 6/2015 |
| WO | WO-2010/094959 A1 | 8/2010 |
| WO | WO-2014/167358 A2 | 10/2014 |

OTHER PUBLICATIONS

U.S. Appl. No. 16/093,449, Xeros Ltd.
U.S. Appl. No. 16/318,192, Xeros Ltd.
International Search Report for International Application No. PCT/GB2017/051049, dated Jul. 26, 2017 (4 pages).
Search Report for British Application No. GB1606402.4, dated Jul. 12, 2016 (1 page).
U.S. Appl. No. 16/497,070, Xeros Ltd.

* cited by examiner

METHOD OF TREATMENT USING A SOLID PARTICULATE MATERIAL AND APPARATUS THEREFOR

The present disclosure relates to methods and apparatus that employ a solid particulate material in the treatment of substrates, particularly animal skin substrates. In particular, the present disclosure relates to methods and apparatus for improved recovery of clean solid particulate material following the treatment of such substrates.

Standard methods for treating or processing animal skin substrates generally require large volumes of water. Such methods for treating or processing include, for example, removal of unwanted materials from the animal skin substrate and chemical modification of the animal skin substrate in order to preserve, colour or waterproof the substrate. For example, in treatment methods where the animal skin substrate comprises a hide, typically 30 kg of water is required per kg of hide. Consequently, carrying out animal skin substrate treatment processes requiring high water usage can be problematic, particularly in areas where water is scarce or access to water is restricted, and may have the effect of restricting the number of animal skin substrates that can be treated. Furthermore, the large volumes of water used in standard animal skin substrate treatment methods means that large amounts of chemicals are also required to provide suitable treatment formulations. This has a further disadvantage of producing proportionally large volumes of contaminated effluent that requires treatment or disposal, and which may cause pollution and have a negative environmental impact. Therefore, there has been a need to reduce the amount of water and chemicals required in animal skin substrate treatment methods.

The present applicant has previously addressed the problem of reducing water consumption in domestic and industrial cleaning methods, particularly for cleaning laundry. Thus, in WO2007/128962 there is disclosed a method and formulation for cleaning a soiled substrate, the method comprising the treatment of the moistened substrate with a formulation comprising a multiplicity of polymeric particles and optionally at least one cleaning material, wherein the formulation is free of organic solvents. In the disclosed embodiments, the substrate comprises a textile fibre.

The use of this cleaning method, however, presents a requirement for the polymeric particles to be efficiently separated from the cleaned substrate at the conclusion of the cleaning operation. This issue was addressed in WO2010/094959, which provides cleaning apparatus requiring the use of two internal drums capable of independent rotation. This issue was also addressed in WO2011/064581 which teaches an apparatus comprising a perforated drum and a removable outer drum skin which is adapted to prevent the ingress or egress of fluids and solid particulate matter from the interior of the drum. The cleaning method requires attachment of the outer skin to the drum during a first wash cycle, after which the skin is removed prior to operating a second wash cycle, following which the cleaned substrate is removed from the drum. In WO2011/098815, there is provided an apparatus for use in the cleaning of soiled substrates, the apparatus comprising housing means having a first upper chamber with a rotatably mounted cylindrical cage mounted therein and a second lower chamber located beneath the cylindrical cage, and additionally comprising at least one recirculation means, access means, pumping means and a multiplicity of delivery means, wherein the rotatably mounted cylindrical cage comprises a drum having perforated side walls where up to 60% of the surface area of the side walls comprises perforations comprising holes having a diameter of no greater than 25.0 mm.

The apparatus disclosed in WO2007/128962, WO2010/094959, WO2011/064581 and WO2011/098815 were principally concerned with the field of laundry where the substrate comprises textile fibres and garments, rather than for the treatment of animal skin substrates.

The applicant has also disclosed processes for treating animal skin substrates using solid particulate material in patent applications published as WO-2014/167358-A, WO-2014/167359-A and WO-2014/167360-A. However, the present inventors have found that in the treatment of animal skin substrates with solid particulate material, a problem arises following recovery of solid particulate material from the animal skin substrate and from the treatment liquor, in that the solid particulate material is typically contaminated with solid waste fragments derived from said substrate and that these solid waste fragments are difficult to remove from the solid particulate material. The inventors have found that simply rinsing the recovered solid particulate material is not adequate and results in only partial removal of the solid waste fragments. This causes particular problems because the presence on the solid particulate material of solid waste fragments can lead to the introduction of undesirable contamination or build-up of solid waste fragments in subsequent treatment processes when the solid particulate material is re-used.

Therefore, it is an object of the present disclosure to provide an apparatus and method of treating substrates, particularly animal skin substrates, having improved recovery of solid particulate material. In particular, it is an object of the present disclosure to provide an apparatus and method of treating substrates, particularly animal skin substrates, from which solid particulate material is recovered having reduced contamination by solid waste fragments derived from the substrate.

According to a first aspect of the present invention, there is provided a method of treating a substrate with a solid particulate material and a treatment liquor comprising:
  agitating the substrate with said solid particulate material and said treatment liquor; and
  (a) separating the substrate from effluent comprising solid waste fragments derived from the substrate, said solid particulate material and the treatment liquor;
  (b) transferring said effluent to a hydrocyclone separator comprising an inlet, a first outlet and a second outlet, wherein the effluent is fed into the hydrocyclone separator via the inlet;
  (c) separating the effluent in the hydrocyclone separator to produce a first stream and a second stream, wherein the first stream comprises said solid particulate material and exits the hydrocyclone separator via the first outlet and wherein the second stream comprises treatment liquor and solid waste fragments and exits the hydrocyclone separator via the second outlet; and
  (d) collecting the first stream after it exits the hydrocyclone separator via the first outlet.

The method of the present invention may be the treatment of a single substrate or may be the treatment of a plurality of substrates simultaneously.

The substrate is preferably an animal skin substrate or a textile fibre or fabric, preferably an animal skin substrate, preferably a hide or a pelt. The present invention is described hereinbelow primarily with regard to animal skin substrates but it will be appreciated that the invention is applicable also to substrates which are textile fibres or fabrics.

A method of treating according to the present invention may be a method of cleaning the substrate. Preferably, however, a method of treating according to the present invention is a tannery process and the substrate is an animal skin substrate, preferably a hide or pelt.

Thus, as used throughout the description in relation to all the aspects disclosed herein, the term "treating" in relation to treating an animal skin substrate is a tannery process, including colouring and tanning and associated tannery processes, preferably selected from curing, beamhouse treatments, pre-tanning, tanning, re-tanning, fat liquoring, enzyme treatment, tawing, crusting, dyeing and dye fixing, preferably wherein said beamhouse treatments are selected from soaking, liming, deliming, reliming, unhairing, fleshing, bating, degreasing, scudding, pickling and depickling. Preferably, said treating is a process used in the production of leather. Preferably, said treating acts to transfer a tanning agent (including a colourant or other agent used in a tannery process) onto or into the animal skin substrate.

As used throughout the description in relation to all aspects disclosed herein, "animal skin substrate" includes skins, hides, pelts, leather and fleeces. Typically, the animal skin substrate is a hide or a pelt. The hide or pelt may be a processed or unprocessed animal skin substrate.

As used herein the term "solid waste fragments derived from the substrate" refers to material which has been separated from the substrate during the method of treating the substrate with a solid particulate material and a treatment liquor. The term "solid" includes fibrous and particulate matter, which may be in the form of a gel. The solid waste fragments are typically suspended in the treatment liquor.

Preferably, the solid waste fragments derived from the substrate are fibrous and/or particulate.

Where the substrate is an animal skin substrate, such as a hide or pelt, typically at least a portion of the solid waste fragments is collagen and/or derivative(s) thereof. Preferably, a major portion of the solid waste solid waste fragments is collagen and/or derivative(s) thereof, typically wherein said collagen and/or derivative(s) thereof constitute at least about 60 wt %, preferably at least about 70 wt %, preferably at least about 80 wt %, preferably at least about 90 wt %, preferably at least about 95 wt % by total weight of the solid waste fragments. Where one or more collagen derivative(s) are present, said collagen derivative(s) are typically present as a minor fraction of the total amount of collagen and collagen derivative(s) present in the solid waste fragments, and collagen is present as a major fraction of the total amount of collagen and collagen derivative(s) present in the solid waste fragments. As used herein, a "derivative" of collagen is a compound produced from collagen by a chemical reaction, and includes a decomposition product thereof. Such a derivative may be produced as a result of the method of treating the substrate with a solid particulate material and a treatment liquor, but alternatively or additionally may have been produced prior to such treatment, for instance as a result of the processing and/or storage conditions experienced by the animal skin substrate before or after (typically after) its removal from the animal. A derivative which is produced as a result of the method of treating the substrate with a solid particulate material and a treatment liquor is typically produced during said treating method.

In the method of the present invention, it is preferred to control the ratio of solid particulate material:liquid in the hydrocyclone, preferably by controlling the ratio of solid particulate material:liquid in the feed stream introduced to the hydrocyclone. Preferably, the ratio of solid particulate material:liquid in the hydrocyclone is controlled by the addition of a liquid diluent to the hydrocyclone and preferably by the addition of a liquid diluent to the feed stream introduced to the hydrocyclone (i.e. the liquid diluent is added to said feed stream prior to introduction of the feed stream into the hydrocyclone). It will be appreciated that the term "feed stream" refers to the effluent separated from the treated substrate as described herein, and may also refer to a recirculated first stream as described hereinbelow. Preferably, the liquid diluent is or comprises one or more recycled liquid stream(s) derived from said first stream and/or said second stream and/or wherein said liquid diluent is or comprises one or more recycled liquid stream(s) derived from further cleaning of the solid particulate material downstream of the hydrocyclone separator, as described hereinbelow. In a preferred embodiment, the liquid diluent is or comprises a recycled liquid stream derived from said second stream exiting the hydrocyclone separator, described further hereinbelow, preferably after removal of some or all of the solid waste fragments therefrom, i.e. wherein the liquid diluent is or comprises the first filtrate stream described hereinbelow. In a further preferred embodiment, said liquid diluent is or comprises a recycled liquid stream derived from the secondary cleaning liquid effluent exiting the secondary cleaning apparatus, described further hereinbelow, preferably after removal of some or all residual solid waste fragments therefrom, i.e. wherein the liquid diluent is or comprises the secondary cleaning filtrate stream described hereinbelow.

Preferably, the ratio of solid particulate material:liquid in the hydrocyclone is such that the feed stream into the hydrocyclone has a ratio in the range of from about 1.0:0.1 (preferably from about 1.0:0.5, preferably from about 1.0:1.0) solid particulate material:liquid to about 1.0:10 (preferably to about 1.0:5.0, preferably to about 1.0:2.0, preferably to about 1.0:1.5) solid particulate material:liquid.

The ratio of solid particulate material:liquid may be controlled by a flow regulator, and/or by the addition of a liquid diluent to the feed stream into the hydrocyclone, as described herein. Preferably, the ratio is controlled by a flow regulator and optionally by the addition of said liquid diluent. The flow regulator suitably comprises a perforated membrane, preferably a perforated pipe, comprising a predetermined number or series of apertures of a predetermined size. A suitable flow regulator is disclosed in, for instance, WO-2015/049541-A Preferably, said first outlet is an underflow of the hydrocyclone separator and said second outlet is an overflow of the hydrocyclone separator.

The hydrocyclone separator is preferably vertically disposed, although it is also possible to dispose the hydrocyclone separator horizontally. The separation between solid particulate material and solid waste fragments achieved in the hydrocyclone separator is preferably gravity-assisted. Thus, relatively dense or heavy material from the feed stream into the hydrocyclone is separated into the underflow (first outlet) of the hydrocyclone separator and relatively less dense or light material from the feed stream into the hydrocyclone is separated into the overflow (second outlet) of the hydrocyclone separator.

Figure 1:
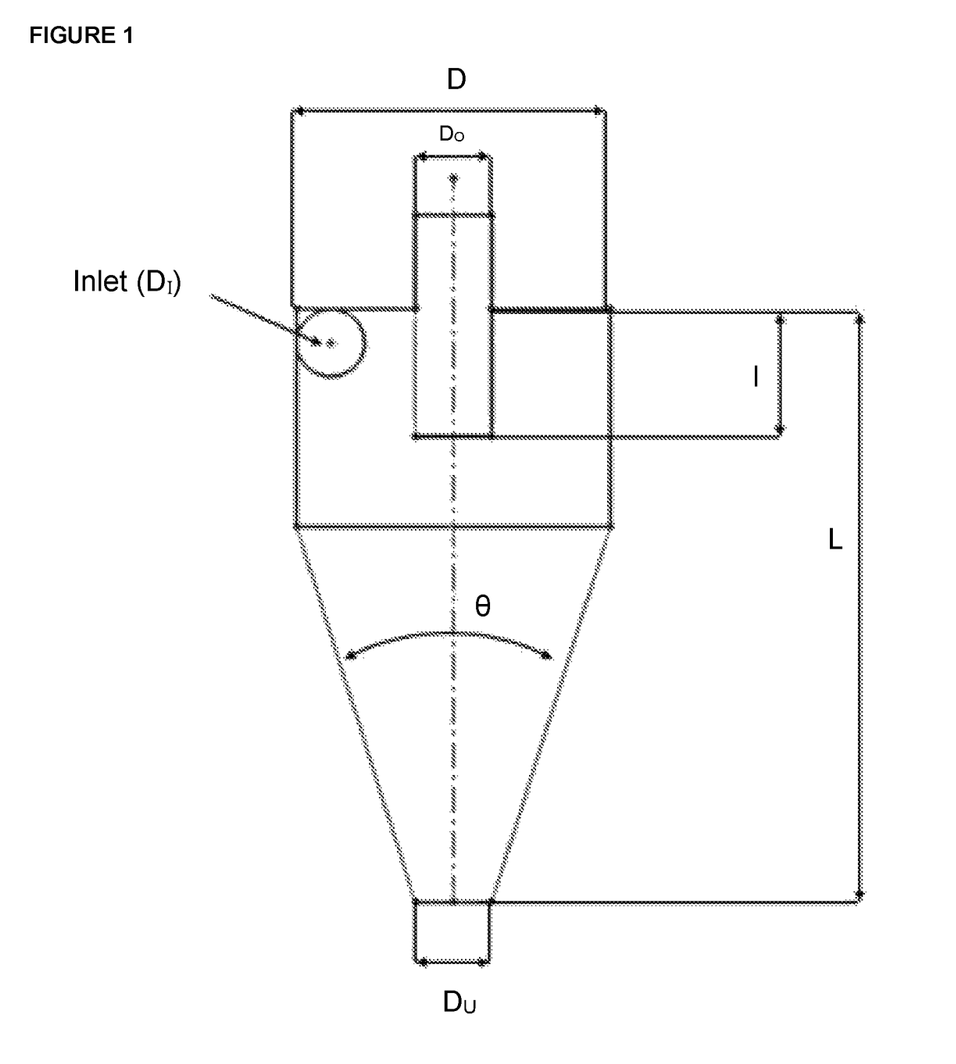
FIG. 1 illustrates the geometry and dimensions of a hydrocyclone separator, and is described hereinabove.
Figure 2:
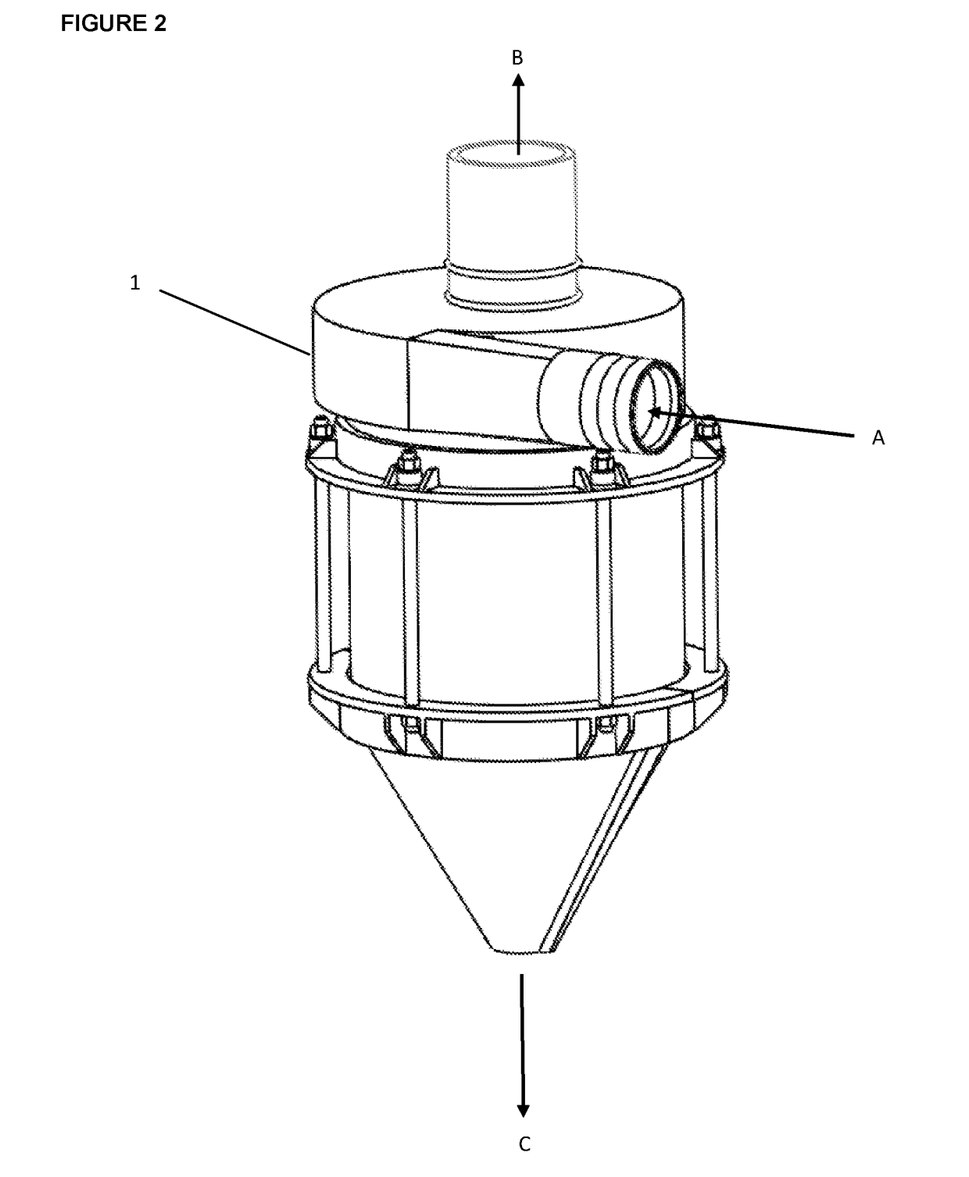
FIG. 2 is a further illustration of a hydrocyclone separator (1), wherein stream (A) is the effluent stream comprising solid particulate material, solid waste fragments and treatment liquor; and stream (B) is the second stream comprising solid waste fragments and treatment liquor; and stream (C) is the first stream comprising solid particulate material and typically also treatment liquor and/or residual solid waste fragments
Figure 3:
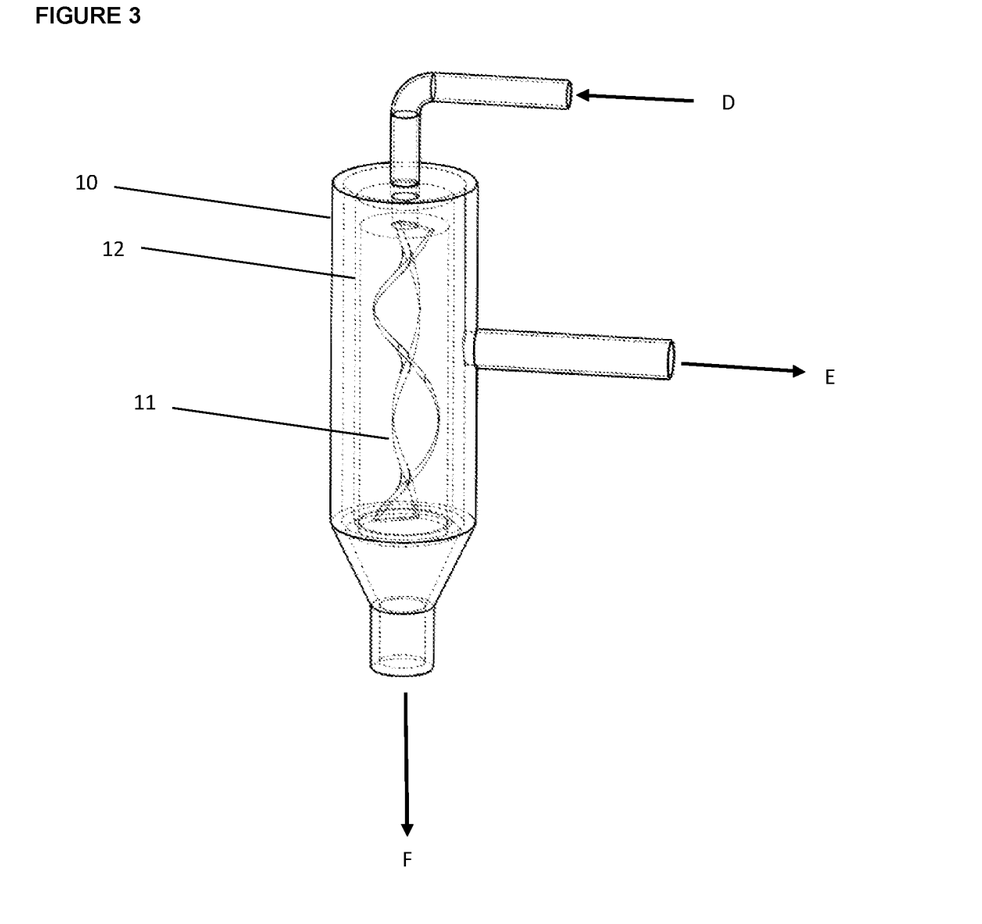
FIG. 3 illustrates a self-cleaning helical filter (10) comprising a helical cleaning element (11) and filter (12), wherein stream (D) is a stream (for instance the second stream) comprising solid waste fragments and liquid (for instance treatment liquor); stream (E) is a liquid filtrate stream (for instance the first filtrate stream) comprising liquid (for instance treatment liquor); and stream (F) is residue (for instance the first residue) comprising solid waste fragments.

The preferred dimensions and geometry of the hydrocyclone are understood with reference to FIG. 1. The hydrocyclone comprises a substantially cylindrical outer body portion and an inlet, a first outlet (underflow) at the lower end of the hydrocyclone and a second outlet (overflow) at the upper end of the hydrocyclone. The inlet is disposed to convert the linear velocity of the feed stream into rotary motion and does so by directing the feed stream tangentially into the outer body. The inlet is disposed at or near the upper end of the hydrocyclone. The second outlet (overflow) comprises a substantially cylindrical pipe having a diameter which is smaller than the diameter of the cylindrical body portion and which is disposed at least partially within said cylindrical body portion (preferably concentrically such that said cylindrical pipe of the second outlet and said cylindrical outer body portion share a common central axis). The hydrocyclone optionally comprises a frustoconical portion at the lower end culminating in the first outlet (underflow), i.e. the optional frustoconical portion extends between the outer body portion and the first outlet (underflow). Preferably, the first outlet (underflow) comprises a substantially cylindrical pipe which is smaller than the diameter of the cylindrical body portion and which is preferably disposed preferably concentrically such that said cylindrical pipe of the first outlet and said cylindrical outer body portion share a common central axis.

The length (L) is the distance from the top of the inlet to the top of the first outlet (the underflow), and preferably L is at least about 500 mm, preferably at least about 800 mm, and typically no more than about 2000 mm.

The diameter $D_I$ is the diameter of the inlet, and preferably this is from about 40 to about 80 mm, preferably from about 45 to about 55 mm, preferably from about 45 to about 50 mm.

The diameter $D_U$ is the diameter of the first outlet (the underflow), and preferably this is from about 20 to about 80 mm, preferably from about 30 to about 40 mm.

The diameter $D_O$ is the diameter of the second outlet (the overflow), and preferably this is from about 30 to about 80 mm, preferably from about 40 to about 50 mm.

The diameter (D) of the outer body portion is preferably from about 100 to about 500 mm, preferably from about 150 to about 300 mm, typically no more than about 200 mm.

The length (l) is the distance from the top of the inlet to the bottom of the second outlet, and preferably l is in the range of from about 200 mm to about 800 mm, preferably from about 200 mm to about 450 mm, preferably from about 250 mm to about 350 mm.

The angle (θ) defined by the walls of the frustoconical section is preferably at least 90°, preferably at least 100°, preferably at least 140°, and in a preferred embodiment is 180°, i.e. preferably the frustoconical section is not present and the base of the body portion is a flat plate in which is disposed the first outlet (underflow).

The method of the present invention is preferably a batch process, preferably a batch process in a treatment chamber, preferably a sealed treatment chamber, preferably wherein the treatment chamber is a rotatably mounted drum as described hereinbelow.

As used throughout the description in relation to all the aspects disclosed herein, the term "agitating" in relation to agitating the substrate with a solid particulate material and a treatment liquor, comprises providing relative movement between the substrate and the solid particulate material and treatment liquor. Typically, agitation of the substrate with a solid particulate material and a treatment liquor is effected by moving, shaking or rotating the substrate, solid particulate material and treatment liquor in a treatment chamber. Preferably, the treatment chamber is a drum. Preferably, the drum is a rotatably mounted drum.

Preferably, the treatment chamber is rotated at a speed of from about 1 to about 50 rpm, from about 1 to about 30 rpm, or from about 1 to about 15 rpm.

Where the substrate is an animal skin substrate and the treating of the animal skin substrate is a beamhouse process or a tanning, retanning, fat-liquoring or a dyeing process, the treatment chamber is generally rotated at a speed of from about 3 to about 14 rpm, from about 5 to about 13 rpm, or from about 8 to about 12 rpm. The treatment chamber may be rotated at a speed of not more than 15 rpm, of not more than 13 rpm, of not more than 12 rpm, of not more than 10 rpm, of not more than 8 rpm, of not more than 6 rpm, of not more than 5 rpm, of not more than 4 rpm, of not more than 3 rpm or not more than 1 rpm. Lower rotational speeds may advantageously produce fewer solid waste fragments.

Where the substrate is an animal skin substrate, the treatment chamber preferably has an opening having a closure movable between a closed position at which the closure prevents the contents of the treatment chamber (such as the animal skin substrate, the solid particulate material, the treatment liquor and solid waste fragments derived from the substrate) from passing through the opening and an open position at which the contents of the treatment chamber can pass through the opening. During agitation of the drum, the closure is normally in the closed position.

The treatment chamber may be of a size commonly found in treatment chambers in animal skin substrate processing plants, such as in tanneries. Typically, the treatment chamber has a capacity of from about 500 to about 200,000 litres. The treatment chamber can have an ullage volume of at least 10% by volume, preferably, at least 20% by volume and more preferably from 30 to 60% or 30 to 70% by volume. These ullage volumes can be effective in order to provide for efficient mixing while maximising the utlilisation capacity of the treatment chamber.

In the methods of treating an animal skin substrate disclosed herein, the treated animal skin substrate is separated from effluent comprising solid waste fragments derived from the substrate, solid particulate material and treatment liquor. The separation step may be effected at least in part by the apparatus in which the method is carried out. Alternatively, the separation step may be effected by an operator, or by a combination of the features of the apparatus and the intervention of an operator.

For example, the apparatus may be configured to retain the animal skin substrate in the treatment chamber while allowing the effluent to drain out, fall out or be pumped out. Alternatively, following agitation of the animal skin substrate with the solid particulate material and the treatment liquor in a treatment chamber, an operator may access the treatment chamber via an opening and remove the animal skin substrate, leaving the effluent in the treatment chamber.

Alternatively, the substrate and the effluent may be allowed to fall out of the treatment chamber under gravity or may be tipped out into a collection vessel from which an operator may remove the animal skin substrate. Preferably, the collection vessel comprises a grating that assists in separation of the animal skin substrate from the effluent by preventing the animal skin substrate from passing through but allowing the effluent to pass through. In this way, the animal skin substrate can be removed from the grating of the collection vessel once the effluent has drained through the grating.

Where the separating step comprises the intervention of an operator, separation of the animal substrate may be done manually or using a mechanical tipping or lifting device, such as a winch or forklift.

The effluent from step (a) may be transferred from the collection vessel to the hydrocyclone separator by a feeding mechanism. The feeding mechanism preferably comprises a pumping means, such as a pump suitable for transferring a mixture of liquid and solids. Preferably, the flow rate of the effluent to the hydrocyclone separator is controlled by the feeding mechanism. Preferably, the flow rate is controlled in a manner to optimise the separation efficiency of the hydrocyclone separator in separating the solid particulate material from the solid waste fragments derived from the substrate.

The First Stream Exiting the Hydrocyclone Separator

It is preferred that the first stream which exits the hydrocyclone separator comprises the solid particulate material as a major fraction and further comprises a minor fraction which is treatment liquor, preferably wherein the first stream comprises at least 70% wt, preferably at least 80% wt, preferably at least 90% wt, preferably at least 95% wt of said solid particulate material by total weight of the first stream. Thus, it is preferred that the treatment liquor in the effluent is separated in the hydrocyclone such that most of the treatment liquor in the effluent which is fed into the hydrocyclone exits the hydrocyclone in said second stream, preferably when at least 60% wt, preferably at least 70% wt, preferably at least 80% wt, preferably at least 90 wt %, preferably at least 95% wt of the treatment liquor in the effluent which is fed into the hydrocyclone exits the hydrocyclone in said second stream.

Preferably, the first stream comprises the solid particulate material as a major fraction and further comprises a minor fraction which is residual solid waste fragments derived from the substrate, preferably wherein the first stream comprises at least 70% wt, preferably at least 80% wt, preferably at least 90% wt, preferably at least 95% wt of said solid particulate material by total weight of the first stream. Thus, it will be appreciated that most of the solid waste fragments in the effluent fed into the hydrocyclone separator is separated from the solid particulate material via the action of the hydrocyclone and exits the hydrocyclone separator in the second stream. However, a relatively small proportion of the solid waste fragments in the effluent, hereinafter referred to as "residual solid waste fragments derived from the substrate" is not separated from the solid particulate material in the hydrocyclone separator. This may occur, for instance, because said residual solid waste fragments are adhered or otherwise associated with the solid particulate material, or because the density or mass of said residual solid waste fragments is such that the residual solid waste fragments are separated from the effluent in the hydrocyclone separator along with the solid particulate material, for instance because the residual solid waste fragments have a density or mass similar to that of the particles of the solid particulate material.

The solid particulate material of the first stream exiting the hydrocyclone is preferably re-used to treat one or more further substrate(s), i.e. in a method of treating a substrate with said cleaned solid particulate material and a treatment liquor.

The first stream may be re-used in the form it exits the hydrocyclone separator, but this is less preferred because it can lead to a build-up of the solid waste fragments in subsequent method(s) of treating a substrate with a solid particulate material and a treatment liquor, and in the apparatus used therefor, and/or reduce the efficacy of the treatment method.

Preferably, the solid particulate material in the first stream is further treated before re-use, in order to at least partially remove residual solid waste fragments from the solid particulate material and increase the cleanliness of the solid particulate material.

In one preferred embodiment, the method of the present invention further comprises recirculating the collected first stream into the hydrocyclone separator, preferably via said inlet, and repeating steps (c) and (d) one or more times (i.e. a finite number of times, and typically no more than 100 times, typically no more than 50 times, typically no more than 25 times, typically no more than 10 times, typically no more than 5 times, typically no more than 3 times). In this embodiment, the first stream may be combined with a liquid diluent prior to introduction of said first stream into the hydrocyclone separator, for instance in order to achieve the desired ratio of solid particulate material to liquid in the feed stream to the hydrocyclone separator. Where the recirculation of the first stream is conducted a plurality of times, then said first stream may be combined with said liquid diluent in each recirculation step or in only one or some of said recirculation steps. In a preferred embodiment, said liquid diluent is or comprises a recycled liquid stream derived from said second stream exiting the hydrocyclone separator, which is described further hereinbelow, preferably after removal of some or all of the solid waste fragments therefrom, i.e. wherein said liquid diluent is or comprises the first filtrate stream. In a further embodiment, said liquid diluent is or comprises a recycled liquid stream derived from the secondary cleaning liquid effluent exiting the secondary cleaning apparatus, which is described further hereinbelow, preferably after removal of some or all residual solid waste fragments therefrom, i.e. wherein said liquid diluent is or comprises the secondary cleaning filtrate stream. Such recirculation of the first stream at least partially removes residual solid waste fragments from the solid particulate material and increases the cleanliness of the solid particulate material, thereby providing cleaned solid particulate material which may then be re-used in a method of treating a substrate with said cleaned solid particulate material and a treatment liquor.

In a further preferred embodiment, the method of the present invention comprises transferring the collected first stream to a secondary cleaning apparatus for further cleaning of the solid particulate material, wherein said cleaning removes at least a portion and preferably substantially all of said residual solid waste fragments from said solid particulate material. Preferably, the secondary cleaning apparatus removes at least about 80%, at least about 85 wt %, at least about 90 wt %, at least about 95 wt %, at least about 98 wt %, at least about 99 wt %, or at least about 99.5 wt % of the residual solid waste fragments present in the first stream.

The cleaned solid particulate material exiting the secondary cleaning apparatus may then be re-used in a further method of treating a substrate with said cleaned solid particulate material and a treatment liquor.

As used throughout the description in relation to all the aspects disclosed herein, by "cleaned solid particulate material" is meant that the solid particulate material has substantially no visible solid waste fragments associated with it. By "visible solid waste fragments" is meant solid waste fragments that can be observed by the naked eye at a distance of about 10 cm. Typically, cleaned solid particulate material has 10% or fewer particles by total number of particles in the solid particulate material with visible solid waste fragments, preferably about 5% or fewer particles, about 3% or fewer particles, about 2% or fewer particles, about 1% or fewer particles, or about 0.5% or fewer particles.

The transfer of the collected first stream to a secondary cleaning apparatus may effected by an suitable conveying or feeding mechanism, for instance comprising pumping means (the pump being suitable for transferring solids and a mixture of liquid and solids); a vibratory feeder; a mechanical conveyer, such as a disc-driven system (such as a disc belt), an Archimedean screw or a conveyor belt; or pneumatic or vacuum conveying means. Alternatively or additionally, the transfer to a secondary cleaning apparatus may comprise transferring the first stream under gravity.

Preferably, the rate of transfer of the first stream to the secondary cleaning apparatus is controlled by a flow regulator, which can reduce or avoid clogging of the secondary cleaning apparatus by the solid particulate material and/or residual solid waste fragments. The flow regulator may be a valve, a rotary valve, or a narrowing in a portion of a flow pathway to the secondary cleaning apparatus. The inclusion of a flow regulator, such as a rotary valve, is preferred particularly where the first stream is transferred to the secondary cleaning apparatus by vacuum conveying.

The secondary cleaning apparatus preferably comprises a secondary separator configured to allow the residual solid waste fragments to pass through the secondary separator, as well as allowing water, any treatment liquor present in the first stream, and any liquid cleaning formulation used in the secondary cleaning apparatus to pass through the secondary separator, wherein cleaning of said solid particulate material comprises retaining said solid particulate material on the surface of said secondary separator and:
  (i) directing a liquid cleaning formulation onto said solid particulate material whilst it is retained on the surface of said secondary separator; and/or
  (ii) agitating said solid particulate material whilst it is retained on the surface of said secondary separator.

Retaining said solid particulate material on a surface of the secondary separator has an advantage of enabling interaction between the solid particulate material and the surface of the secondary separator, and thereby providing cleaner solid particulate material. Preferably, retaining said solid particulate material on a surface of the secondary separator during said treating comprises retaining said solid particulate material on the surface for a residence time (t). Increasing the residence time (t) of the solid particulate material on the treatment separator has an advantage of increasing the interaction between the solid particulate material and the surface of the treatment separator. Typically, residence time (t) is at least about 5 seconds, at least about 8 seconds, at least about 10 seconds, or at least about 15 seconds. Typically, the residence time (t) is no more than about 10 minutes, no more than about 5 minutes, no more than about 2 minutes, or no more than about 1 minute. Typically, the mass of solid particulate material on the surface of the separator is being continuously replenished with new solid particulate material flowing onto the separator and being continuously depleted by the removal of cleaned solid particulate from the separator (for instance via the access means disclosed herein) and so the term "residence time" preferably refers to the average residence time of a particle in a plurality of particles retained on the surface of the separator.

In one preferred embodiment, said further cleaning of said solid particulate material in the secondary cleaning apparatus comprises or consists of directing a liquid cleaning formulation onto said solid particulate material whilst it is retained on the surface of said secondary separator.

In a further preferred embodiment, said further cleaning of said solid particulate material in the secondary cleaning apparatus comprises or consists of agitating said solid particulate material whilst it is retained on the surface of said secondary separator. The agitation advantageously turns the particles during performance of the method, thereby exposing different parts of the particle surface to the separator surface and any cleaning formulation, which can result in a cleaner particle.

In a further preferred embodiment, said further cleaning of said solid particulate material in the secondary cleaning apparatus comprises or consists of (i) directing a liquid cleaning formulation onto said solid particulate material whilst it is retained on the surface of said secondary separator and (ii) agitating said solid particulate material whilst it is retained on the surface of said secondary separator. The cleaning formulation may be directed onto the solid particulate material sequentially or simultaneously with the agitating of the solid particulate material. Where steps (i) and (ii) are conducted sequentially, the steps may be conducted in either order, and one or both of step(s) (i) and (ii) may be conducted once or a plurality of times, optionally cyclically. Where steps (i) and (ii) are conducted simultaneously, the further cleaning of the solid particulate material in the secondary cleaning apparatus may optionally further comprise an operational time period during which one or both steps are operated in isolation. Thus, a combination of sequential and simultaneous operation of steps (i) and (ii) is also envisaged.

The secondary separator preferably comprises a plurality of apertures. The secondary separator may comprise a web, mesh or grill. Alternatively, the secondary separator may comprise a sheet having a plurality of apertures formed therein, that is, wherein the apertures are created in an existing sheet (referred to herein as post-formed apertures, and wherein the sheet having the post-formed apertures is referred to herein as being "perforated"). Preferably, the secondary separator comprises a planar surface having apertures. Preferably, the secondary separator is a perforated sheet.

The apertures of the web or mesh or grill and the apertures formed in an existing sheet are sized so as to permit the passage of treatment liquor and residual solid waste fragments whilst preventing the passage of the solid particulate material. The size of the apertures in the secondary separator depends on the size of the particles of the solid particulate material used in the method of treating the substrate. As such, the apertures of the secondary separator are required to be smaller than the smallest dimension of the solid particulate material.

The apertures of the secondary separator may be any suitable shape, such as slots, circles, ovals, ellipses or hexagons. Preferably the secondary separator comprises apertures that have a smooth (i.e. and non-angular) perimeter, such as circles, ovals or ellipses. An advantage of having shapes without vertices, such as circles, ovals and ellipses, is that fouling of the secondary separator by the solid waste fragments (which may be referred to as formation of solid waste fragment stalactites) may be reduced or prevented.

The total open area of the secondary separator (wherein the total open area is the total surface area of the apertures as a percentage of the total surface area of the secondary separator) is typically at least about 5%, at least about 10%, at least about 15%, at least about 20%, at least about 30%, at least about 40%, at least about 45%, at least about 50%, at least about 55%, or at least about 60%. The total open area of the secondary separator is preferably no more than about 99%, no more than about 90%, no more than about 80%, no more than about 75%, no more than about 70%, no more than about 65%. Preferably, the total open area is from about 15% to about 70%, preferably from about 20% to about 65%.

An example of a particularly preferred secondary separator comprises a multiplicity of wedge-shaped rods or wires positioned together to form a grill. In this arrangement, the apertures in the secondary separator are comprised of the gaps between the wedge-shaped rods or wires and are linear apertures. Preferably, the wedge-shaped rods or wires are arranged to form a grill in such a way as to present an essentially planar surface on the side of the grill on which the first stream strikes the secondary separator. Preferably, the wedge-shaped rods or wires are arranged so that they are substantially parallel.

The secondary separator may be made from or comprise a metal (including an alloy), a polymer (including a polymeric composite (such as a glass fibre reinforced polymer)) or a ceramic. Preferably, the secondary separator is made from metal, more preferably stainless steel.

The secondary separator may be woven (such as a mesh formed from an interlaced network of wire or thread) or a sheet or plate with apertures formed therein (i.e. non-woven). Preferably, the secondary separator is non-woven.

Preferably, the secondary separator is planar, for example, the secondary separator may comprise a plate with apertures formed therein. Preferably, the secondary separator comprises or consists of a non-woven mesh, such as a perforated sheet. Preferably, the secondary separator comprises or consists of a perforated metal sheet or plate. Having a metal plate with apertures formed therein generally reduces trapping of solid waste fragments compared with woven or mesh structures and allows for easier cleaning. Metal plates with apertures formed therein also suffer less from deformation and therefore require replacing less frequently.

In particular, the use of a metal plate having oval or elliptical apertures formed therein as the secondary separator leads to high levels of solid particulate material separation and reduces the fouling of the separator by the solid waste fragments. Furthermore, the use of a metal plate is advantageous as it is durable and better able to withstand cleaning, in particular solid waste fragment removal, without distorting aperture size or shape.

Alternatively, the secondary separator may be comprised as part of a moving conveying mechanism. For example, the secondary separator may comprise or consist of an apertured continuous belt that is able to move.

Where the further cleaning of said solid particulate material in the secondary cleaning apparatus comprises or consists of agitating said solid particulate material, agitating said typically comprises vibrating the secondary separator or moving the secondary separator, such as rotating the secondary separator or subjecting the secondary separator to a reciprocating motion or linear motion in a single direction. Agitating said secondary separator in this way provides relative movement between the secondary separator and said solid particulate material retained on the surface of the secondary separator. Preferably, the secondary cleaning apparatus comprises a vibratory separator. Thus, preferably, agitating step (ii) comprises vibration of the treatment separator.

The vibrational movement referred to herein preferably provides at least a component of movement in the vertical plane, more preferably the movement provided is in the vertical and horizontal planes.

Preferably, the secondary separator is substantially circular or substantially elliptical. Preferably, the secondary separator is substantially circular. An advantage of having a substantially circular secondary separator that vibrates is that solid particulate material that is retained on the secondary separator typically moves across the secondary separator during the performance of the method, for example in a spiral path, which increases the residence time (t) of the solid particulate material on the secondary separator.

Preferably, the secondary separator is associated with an access means configured to remove the solid particulate material which is unable to pass through the secondary separator. Typically, the access means is a port, a valve, a tap or an opening having a closure. Preferably, the solid particulate material exits the secondary separator through the access means.

Where the further cleaning of said solid particulate material in the secondary cleaning apparatus comprises or consists of directing a liquid cleaning formulation onto said solid particulate material, the cleaning formulation may comprise or consist of water. Thus, preferably, the liquid cleaning formulation is an aqueous cleaning formulation. The liquid cleaning formulation preferably comprises water and preferably a major fraction of the liquid cleaning formulation is water. The cleaning formulation may comprise a cleaning agent, such as a detergent composition. The cleaning formulation may comprise or consist of water and at least one cleaning agent. Alternatively, the cleaning formulation consists of water. Preferably, the cleaning formulation does not comprise any solid material, including any suspended solids. More than one type of cleaning formulation may be used. Thus, in one preferred embodiment, a first cleaning formulation which comprises or consists of water and at least one cleaning agent is directed onto the solid particulate material, followed by a second cleaning formulation which consists of water, or which comprises or consists of water and at least one cleaning agent which is different from said at least one cleaning agent in the first cleaning formulation. In another preferred embodiment, a first cleaning formulation is or comprises a filtrate stream (as described herein) and a second cleaning formulation comprises or consists of water, optionally with at least one cleaning agent.

The detergent composition may comprise cleaning components such as surfactants, enzymes and bleach. Oxidative compounds and buffers may also be used.

Examples of suitable surfactants that can be included in the detergent composition can be selected from non-ionic and/or anionic and/or cationic surfactants and/or ampholytic (including zwitterionic) surfactants. The surfactant can typically be present at a level of from about 0.1%, from about 1%, or even from about 5% by weight of the detergent composition to about 99.9%, to about 80%, to about 35%, or even to about 30% by weight of the detergent composition.

The detergent composition may include one or more detergent enzymes which provide cleaning performance benefits. Examples of suitable enzymes include, but are not limited to, hemicellulases, peroxidases, proteases, other cellulases, other xylanases, lipases, phospholipases, esterases, cutinases, pectinases, collagenases, keratinases, reductases, oxidases, phenoloxidases, lipoxygenases, ligninases, pullulanases, tannases, pentosanases, malanases, [beta]-glucanases, arabinosidases, hyaluronidase, chondroitinase, laccase, and amylases, or mixtures thereof. Preferably, the detergent composition comprises at least a protease, for instance a collagenase. The enzyme is preferably present at a level of from about 0.01% to about 10%, more preferably from about 0.01% to about 5% by weight of the cleaning composition.

Optionally, enzyme stabilisers may also be included in the detergent composition. In this regard, enzymes for use in detergents may be stabilised by various techniques, for example by the incorporation of water-soluble sources of calcium and/or magnesium ions in the compositions.

The detergent composition may include one or more bleach compounds and optionally associated catalysts and/ or activators. Examples of such bleach compounds include, but are not limited to, peroxygen compounds, including hydrogen peroxide, inorganic peroxy salts, such as perborate, percarbonate, perphosphate, persilicate, and mono persulphate salts (e.g. sodium perborate tetrahydrate and sodium percarbonate), and organic peroxy acids such as peracetic acid, monoperoxyphthalic acid, diperoxydodecanedioic acid, N,N'-terephthaloyl-di(6-aminoperoxycaproic acid), N,N'-phthaloylaminoperoxycaproic acid and amidoperoxyacid. Bleach activators include, but are not limited to, carboxylic acid esters such as tetraacetylethylenediamine and sodium nonanoyloxybenzene sulphonate.

Typically, the cleaning formulation is directed onto the solid particulate material on the secondary separator via one or more spraying means, such as one or more hoses or one or more nozzles. Preferably, directing the cleaning formulation onto the solid particulate material comprises pumping, typically at a pressure of from about $2 \times 10^5$ Pa to about $10^6$ Pa.

The composition of the cleaning formulation may depend on the nature of the solid waste fragments present on the solid particulate material. As such, the composition of the cleaning formulation may depend on the type of substrate that the solid particulate material has treated. For example, a cleaning formulation consisting of water may be used to treat the solid particulate material when certain animal skin substrates are treated, whereas for other animal skin substrates a cleaning formulation comprising water and a detergent composition may be required.

The further cleaning of said solid particulate material in the secondary cleaning apparatus provides cleaned solid particulate material and a secondary cleaning effluent comprising residual solid waste fragments and may further comprise said liquid cleaning formulation and/or any treatment liquor present in the first stream. Where the further cleaning of said solid particulate material in the secondary cleaning apparatus comprises or consists of directing a liquid cleaning formulation onto said solid particulate material, the secondary cleaning effluent is a secondary cleaning liquid effluent.

The secondary cleaning liquid effluent comprises residual solid waste fragments and liquid cleaning formulation used in the secondary cleaning apparatus and/or any treatment liquor present in the first stream, and preferably comprises at least liquid cleaning formulation used in the secondary cleaning apparatus, optionally further comprising any treatment liquor present in the first stream.

The method of the present invention preferably further comprises the step of recycling said secondary cleaning liquid effluent, preferably to the hydrocyclone separator, preferably via said inlet, and preferably after removal of some or all residual solid waste fragments from the secondary cleaning liquid effluent (in which case the secondary cleaning liquid effluent is recycled in the form of a "secondary cleaning filtrate stream" as defined hereinbelow). Where the secondary cleaning liquid effluent is recycled to the hydrocyclone separator, it is preferably used as a liquid diluent to the feed stream (for instance, the recirculated first stream, or the effluent separated from the treated substrate) into the hydrocyclone separator and combined with said feed stream prior to the introduction of the feed stream into the hydrocyclone separator. Alternatively or additionally, the method of the present invention comprises recycling said secondary cleaning liquid effluent back to the secondary cleaning apparatus to further treat said solid particulate material, preferably after removal of some or all residual solid waste fragments from the secondary cleaning liquid effluent (in which case the secondary cleaning liquid effluent is recycled in the form of a "secondary cleaning filtrate stream" as defined hereinbelow).

Preferably, the method further comprises passing the secondary cleaning liquid effluent through a first fine grading separator to remove some or all of the residual solid waste fragments from the secondary cleaning liquid effluent to provide a filtrate stream referred to herein as the "secondary cleaning filtrate stream". It is this secondary cleaning filtrate stream which is then recycled according to one or more of the preferred embodiments of the invention, as defined immediately hereinabove in respect of the secondary cleaning liquid effluent.

The first fine grading separator may be as defined above in respect of the secondary separator but has apertures sized to allow liquid, such as cleaning formulation and treatment liquor, to pass through but prevents substantially all solid waste fragments (i.e. said residual solid waste fragments) from passing through. Preferably, the first fine grading separator removes at least about 80%, at least about 85 wt %, at least about 90 wt %, at least about 95 wt %, at least about 98 wt %, at least about 99 wt %, or at least about 99.5 wt % of the solid waste fragments present in the secondary cleaning liquid effluent.

Preferably the secondary separator and the first fine grading separator are comprised in a multilayer separating apparatus, wherein the multilayer separating apparatus is configured so that any material to be separated is exposed to the secondary separator before it is exposed to the first fine grading separator.

An advantage of the multilayer separating apparatus is that it integrates the secondary separator and the first fine grading separator into a single component. Preferably, the secondary separator and the first fine grading separator are stacked such that the secondary separator is positioned above the first fine grading separator. Preferably, the secondary separator is positioned above and substantially directly aligned with the first fine grading separator.

Preferably, said multilayer separating apparatus comprises a moving mechanism, preferably a vibratory mechanism, for moving or vibrating the secondary separator, and optionally also the first fine grading separator, during performance of the method.

Preferably, the multilayer separating apparatus is a moving or vibrating separator, more preferably a moving or vibrating self-cleaning separator.

In the multilayer separating apparatus, it is preferred that the secondary separator and preferably also the first fine grading separator are preferably substantially circular or substantially elliptical, preferably substantially circular. Preferably, at least the secondary separator (particularly when the secondary separator is a vibratory separator) is substantially circular.

Preferably, the multilayer separator apparatus comprises an access means associated with each layer of the multilayer separator in order to remove material that is unable to pass through each separator layer. In this way, for example, solid particulate material can be removed from the multilayer separator apparatus via an access means associated with the secondary separator, and solid waste fragments smaller than the solid particulate material may be removed from the multilayer separator apparatus via an access means associated with the fine grading separator. Typically, the access means is a port, a valve, a tap or an opening having a closure. Preferably, the solid particulate material and/or said solid waste fragments exit through their respective access means.

Where the secondary separator and first fine grading separator are separate pieces of equipment, the method comprises transferring the secondary cleaning effluent from the secondary separator to the first fine grading separator, which may be achieved by suitable conveying or feeding mechanism, and/or transferring the secondary cleaning effluent under gravity, as described hereinabove in respect of the first stream.

In a further preferred embodiment, the method comprises passing the secondary cleaning liquid effluent to a filtration apparatus which is or comprises a self-cleaning filter (as described hereinbelow) to provide said secondary cleaning filtrate stream. Such a filtration apparatus is typically an alternative to said first fine grading separator, but may also be additional and subsequent to the first fine grading separator (i.e. the filtrate stream from the first fine grading separator is passed to said filtration apparatus and the filtrate stream from said filtration apparatus then becomes said secondary cleaning filtrate stream which is preferably recycled as described hereinabove).

The Second Stream Exiting the Hydrocyclone Separator

The method of the present invention preferably further comprises collecting the second stream after it exits the hydrocyclone separator via the second outlet and transferring the second stream to a filtration apparatus that allows treatment liquor to pass through the filtration apparatus but which prevents said solid waste fragments from passing through the filtration apparatus, providing a first filtrate stream comprising treatment liquor and a first residue comprising said solid waste fragments.

Preferably, the filtration apparatus prevents at least about 80%, preferably at least about 85 wt %, preferably at least about 90 wt %, preferably at least about 95 wt %, preferably at least about 98 wt %, preferably at least about 99 wt %, and preferably at least about 99.5 wt % of the solid waste fragments present in the second stream from passing through the filtration apparatus.

The first filtrate stream is preferably recycled back to the hydrocyclone separator, preferably via said inlet. Where the first filtrate stream is recycled to the hydrocyclone separator, it is preferably used as a liquid diluent to the feed stream (for instance, the recirculated first stream, or the effluent separated from the treated substrate) into the hydrocyclone separator and preferably combined with said feed stream prior to the introduction of the feed stream into the hydrocyclone separator. Thus, the first filtrate stream may be used as a liquid diluent to control the solid particulate material: liquid ratio in the feed stream into the hydrocyclone separator. The first filtrate stream may be used as a liquid diluent to the effluent fed into the hydrocyclone. Alternatively or additionally, the first filtrate stream may be utilised as a liquid diluent in the embodiments of the invention in which the first stream is further treated by recirculating the collected first stream into the hydrocyclone separator, preferably via said inlet, and repeating steps (c) and (d) one or more times, preferably wherein the first stream is combined with the liquid diluent prior to recirculating into the hydrocyclone separator.

The filtration apparatus may have only a single filtration layer, or may have a plurality of filtration layers of different gradings.

A single layer filtration apparatus comprises a filtration layer having apertures which are sized to permit the passage of the treatment liquor but to prevent passage of at least a portion (and preferably substantially all) of the solid waste fragments in the second stream.

A multi-layer filtration apparatus comprises a first filtration layer comprising apertures which are sized to permit the passage of the treatment liquor but to prevent passage of a portion of the solid waste fragments in the second stream, and further comprises a second filtration layer comprising apertures which are sized to permit the passage of the treatment liquor but to prevent passage of at least a portion (and preferably substantially all) of the remaining solid waste fragments in the filtrate from the first filtration layer. Optionally, a multi-layer filtration apparatus comprises one or more subsequent filtration layers wherein each filtration layer comprises apertures which are sized to permit the passage of the treatment liquor but to prevent passage of the remaining solid waste fragments in the filtrate from the second layer. Preferably, the second filtration layer and where present the subsequent filtration layer(s) of a multi-layer apparatus exhibit finer grading than the previous layer, i.e. the apertures in the second filtration layer and where present the subsequent filtration layer(s) are smaller than the apertures in a previous layer. However, a multilayer apparatus may also comprise consecutive filtration layers in which the grading and apertures are substantially the same.

In general, a filtration layer in the filtration apparatus may be as described for the secondary separator hereinabove, and all aspects of the secondary separator described hereinabove are applicable also to a filtration layer in the filtration apparatus. Thus, the filtration layer of a single layer filtration apparatus may be as described hereinabove for the secondary separator. Similarly, each filtration layer of a multi-layer filtration apparatus may be as described hereinabove for the secondary separator or first fine grading separator. A multi-layer filtration apparatus may be as described hereinabove for the multi-layer separating apparatus, for instance comprising a plurality of stacked and graded layers. In one embodiment, the filtration apparatus does not comprise a moving or vibratory mechanism for moving one or more filtration layer(s) in the filtration apparatus. Thus, the filtration apparatus may be a static apparatus, rather than a moving or vibratory apparatus.

Preferably, the filtration apparatus is or comprises a sieve or filter. Thus, the filtration apparatus may be a single layer sieve or filter, or a multi-layer sieve or filter (preferably a multi-layer graded sieve or filter).

Preferably, the filtration apparatus is or comprises a self-cleaning filter. Self-cleaning filters generally operate by the mechanical and periodic removal of residue from the filter.

In some self-cleaning filters, the residue may be periodically drained from the filtration apparatus via a valve or other means. A self-cleaning filter may operate under elevated pressure, and suitable means for pressuring the second stream can readily be connected to the filtration apparatus. A preferred self-cleaning filter comprises a rotatable helical cleaning element (preferably horizontally disposed) which scrapes the filter surface clean when rotated. An example of a self-cleaning filter is described in EP-0884079-A, for instance.

Pre-Treatment of the Effluent

The method of the present invention preferably further comprises pre-treating the effluent prior to transferring the effluent to the hydrocyclone separator, wherein the pre-treating of the effluent comprises removing solid waste fragments of a size substantially larger than said solid particulate material. Preferably, the means for pre-treating is a coarse grading separator configured to allow the solid particulate material to pass through but to prevent material of a size substantially larger than said solid particulate material from passing through.

The coarse grading separator may be as defined hereinabove in respect of the secondary separator but with larger apertures, that is, having apertures which allow the solid particulate material to pass through. Typically, the smallest dimension of the apertures of the coarse grading separator are at least about 10% larger, at least about 15% larger, at least about 20% larger, at least about 25% larger, preferably at least about 50% larger, preferably at least about 100% larger, preferably at least about 150% larger than the largest dimension of the particles in the solid particulate material.

Typically, the material of a size substantially larger than said solid particulate material comprises solid waste fragments derived from the substrate. In this way, pieces of substrate that have become detached from the substrate during the method of treating, or any other large objects, such as tools, that have entered the effluent can be captured and removed from the effluent prior to recovery and cleaning of the solid particulate material.

The Solid Particulate Material

The solid particulate material may also be referred to as a "multiplicity of solid particles". The solid particulate material may be re-used one or more times in methods of treating according to the invention. Typically, the solid particulate material is re-used at least two, three, four, five or more times, such as 10, 20, 50 or 100 or more times in methods of treating according to the invention. The solid particulate material is generally not re-used more than 10,000 times, preferably not more than 1000 times The solid particulate material recovered from one method of treating according to the invention may be re-used in a subsequent method of treating according to the invention, wherein said one method of treating and said subsequent method of treating are different methods each according to the invention. In which case, the substrate(s) subjected to said subsequent method of treating may be the same or different substrate(s) which were subjected to said one method of treating.

The solid particulate material may be re-used one or more times in treating the same substrate(s). Preferably, however, a method of treating according to the invention is a batch process in a sealed treatment chamber and is preferably performed once per batch of substrate(s). As noted above, the solid particulate material may nevertheless be re-used one or more time in treating the same the substrate(s) in a different and subsequent method according to the invention.

The solid particulate material may be in the form of beads. The solid particulate material may comprise or may consist of a multiplicity of polymeric particles. The solid particulate material may comprise or may consist of a multiplicity of non-polymeric particles. The solid particulate material may comprise or may consist of a mixture of polymeric particles and non-polymeric particles.

The polymeric particles may comprise polyalkenes (such as polyethylene and polypropylene), polyamides, polyesters, polysiloxanes or polyurethanes. Of these, polyalkenes are preferred, especially polypropylene. Said polymers can be linear, branched or crosslinked. The polymeric particles may comprise polyamide or polyester particles, particularly particles of nylon, polyethylene terephthalate or polybutylene terephthalate, typically in the form of beads.

Various nylon homo- or co-polymers may be used including, but not limited to, Nylon 6 and Nylon 6,6. The nylon may comprise Nylon 6,6 copolymer having a molecular weight in the region of from about 5000 to about 30000 Daltons, such as from about 10000 to about 20000 Daltons, or such as from about 15000 to about 16000 Daltons. Useful polyesters may have a molecular weight corresponding to an intrinsic viscosity measurement in the range of from about 0.3 to about 1.5 dl/g, as measured by a solution technique such as ASTM D-4603.

The polymeric particles can comprise foamed polymers or unfoamed polymers.

The polymeric particles may comprise fillers, such as mineral fillers (for instance, barium sulphate).

Optionally, copolymers of the above polymeric materials may be employed. Specifically, the properties of the polymeric materials can be tailored to specific requirements by the inclusion of monomeric units which confer particular properties on the copolymer.

The non-polymeric particles may comprise particles of glass, silica, stone, metal, or ceramic materials. Suitable metals include, but are not limited to, zinc, titanium, chromium, manganese, iron, cobalt, nickel, copper, tungsten, aluminium and tin, and alloys thereof. Suitable ceramics include, but are not limited to, alumina, zirconia, tungsten carbide, silicon carbide and silicon nitride.

The polymeric or non-polymeric particles can be chemically modified to include one or more moieties selected from the group consisting of: enzymes, oxidizing agents, catalysts, metals, reducing agents, chemical cross-linking agents and biocides.

The polymeric particles or non-polymeric particles may be of such a shape and size as to allow for good flowability and intimate contact with the substrate. A variety of shapes of particles may be used, such as cylindrical, ellipsoidal, spheroidal, spherical or cuboid, or shapes therebetween. Appropriate cross-sectional shapes may be employed including, for example, annular ring, dog-bone and circular. Non-polymeric particles comprising naturally occurring materials such as stone may have various shapes, dependent on the way they cleave during manufacture. Preferably, the polymeric particles and the non-polymeric particles comprise generally ellipsoidal or spherical beads. Spherical and ellipsoidal shaped particles are particularly preferred as they provide good mechanical action on the substrate; are generally easier to separate from the substrate; and because particles having these shapes can be more readily cleaned (it has been found that solid waste fragments are more readily separated from such shapes).

The polymeric particles or non-polymeric particles may have smooth or irregular surface structures and may be of solid, porous or hollow structure or construction. Smooth surfaces which are substantially free from holes, pores, projections and other imperfections are preferred because such particles are more readily cleaned.

The particles of the solid particulate material preferably exhibit an average mass of from about 1 mg to about 3000 mg, or from about 1 mg to about 1000 mg, or from about 1 mg to about 700 mg, or from about 1 mg to about 500 mg, or from about 1 mg to about 300 mg, or from about 1 mg to about 150 mg, or from about 1 mg to about 70 mg, or from about 1 mg to about 50 mg, or from about 1 mg to about 35 mg, or from about 10 mg to about 30 mg, or from about 12 mg to about 25 mg. Alternatively, the particles may have an average mass of from about 10 mg to about 800 mg, or from about 50 mg to about 700 mg, or from about 70 mg to about 600 mg.

The particles of the solid particulate material preferably exhibit a surface area of from about 10 $mm^2$ to about 1000 $mm^2$, or from about 10 $mm^2$ to about 200 $mm^2$, or from about 10 $mm^2$ to about 120 $mm^2$. In a preferred embodiment, the particles have a surface area of from about 15 $mm^2$ to about 60 mm², or from about 20 mm² to about 40 mm². In a further preferred embodiment, the particles have a surface area from about 35 mm² to about 70 mm².

The polymeric particles preferably exhibit have an average density in the range of from about 0.5 g/cm³ to about 8.0 g/cm³. Preferably the average density is at least about 0.6 g/cm³, preferably at least about 1.0 g/cm³, preferably at least about 1.1 g/cm³, preferably at least about 1.2 g/cm³, preferably at least about 1.3 g/cm³, preferably at least about 1.4 g/cm³, preferably at least about 1.5 g/cm³. Preferably the average density is no more than about 8.0 g/cm³, preferably no more than about 5.0 g/cm³, preferably no more than about 3.5 g/cm³, preferably no more than about 3.0 g/cm³, preferably no more than about 2.5 g/cm³. Preferably, the average density is in the range of from about 0.6 g/cm³ to about 5.0 g/cm³, preferably from about 1.0 g/cm³ to about 3.5 g/cm³, preferably from about 1.1 g/cm³ to about 3.0 g/cm³, preferably from about 1.5 to about 2.5 g/cm³.

The non-polymeric particles preferably exhibit an average density in the range of from about 0.5 g/cm³ to about 20 g/cm³, from about 2 g/cm³ to about 20 g/cm³, from about 4 g/cm³ to about 15 g/cm³, from about 4 g/cm³ to 10 g/cm³, from about 3.5 g/cm³ to about 12.0 g/cm³, from about 5.0 g/cm³ to about 10.0 g/cm³ or from about 6.0 g/cm³ to about 9.0 g/cm³. The non-polymeric particles may have an average density greater than the polymeric particles.

The average volume of the polymeric and non-polymeric particles is preferably in the range of from about 5 to about 500 mm³, from about 5 to about 275 mm³, from about 8 to about 140 mm³, or from about 10 to about 120 mm³.

The particles of the solid particulate material preferably have an average particle diameter of from about 1 mm to about 200 mm, from about 1 mm to about 100 mm, from about 1 mm to about 50 mm, from about 1 mm to about 25 mm, from about 1 mm to about 10 mm, from about 2 mm to about 8 mm, from about 3 mm to about 7 mm or from about 4 mm to about 6 mm. The effective average diameter can also be calculated from the average volume of a particle by simply assuming the particle is a sphere. The average is preferably a number average. The average is preferably performed on at least about 10, more preferably at least about 100 particles and especially at least about 1000 particles.

The particles of the solid particulate material preferably have a length of from about 1 mm to about 200 mm, from about 1 mm to about 100 mm, from about 1 mm to about 50 mm, from about 1 mm to about 25 mm, from about 1 mm to about 15 mm, from about 1 mm to about 10 mm, from about 2 mm to about 8 mm, from about 3 mm to about 7 mm, from about 4 mm to about 6 mm, or from about 4.5 mm to about 5 mm. The length can be defined as the maximum two-dimensional length of each three-dimensional solid particle. Preferably, the length is measured using Vernier calipers. The average is preferably a number average. The average is preferably performed on at least about 10, more preferably at least about 100 particles and especially at least about 1000 particles.

The particles may be generally spherical in shape (but not necessarily a perfect sphere) having a particle diameter, $d_s$, in the region of from about 1.0 to about 15.0 mm, from about 2.0 to about 8.0 mm or from about 4.0 mm to about 8.0 mm.

The particles may be perfectly spherical in shape having a particle diameter, $d_{ps}$, in the region of from about 1.0 to about 15.0 mm, of from about 2.0 to about 8.0 mm, or from about 4.0 mm to about 8.0 mm.

The Treatment Liquor

As used throughout the description in relation to all the aspects disclosed herein, the term "treatment liquor" is a liquid used in the treating of the substrate, which is preferably an animal skin substrate. Preferably, the treatment liquor is an aqueous liquor. Thus, the treatment liquor preferably comprises water and preferably a major fraction of the treatment liquor is water. The treatment liquor can comprise at least about 0.1% w/w water, or at least about 1% w/w water, or at least about 5% w/w water, or from about 5% to about 99.9% w/w water. Minor amounts of organic solvents, preferably less than about 10% w/w, more preferably less than about 5% w/w, can be present in the treatment liquor but preferably organic solvents are absent from the treatment liquor. Alternatively, the treatment liquor is substantially free from water except for water originating from the substrate.

The treatment liquor preferably comprises at least one treatment agent.

In the treatment of an animal skin substrate, typical treatment agents include tanning agents, re-tanning agents, colorants and other tannery process agents suitable for use in the tannery processes noted hereinabove.

A tannery process agent can be selected to chemically modify the animal substrate, such as by linking and locking collagen protein strands of the animal substrate together. A tanning or retanning agent can be a synthetic tanning agent, vegetable tanning agent or mineral tanning agent, such as chromium III salts. Where the treatment liquor comprises chromium III salts, typically the chromium III salt is present in an amount of from 8% w/w or less, from 6% w/w or less, from 5% w/w or less, or preferably from 4.5% w/w or less based on the mass of the animal substrate.

Where the treatment liquor comprises a colorant, the colorant is typically selected from one or more dyes, pigments, optical brighteners or mixtures thereof.

Other Aspects of the Invention

In a second aspect of the present disclosure, there is provided a method of cleaning solid particulate material recovered from a substrate treatment process, preferably an animal skin substrate treatment process, in which said substrate had been treated with said solid particulate material and a treatment liquor, the method of cleaning the recovered solid particulate material comprising (a) transferring effluent comprising solid waste fragments derived from the substrate, said solid particulate material and the treatment liquor to a hydrocyclone separator comprising an inlet, a first outlet and a second outlet, wherein the effluent is fed into the hydrocyclone separator via the inlet;

(b) separating the effluent in the hydrocyclone separator to produce a first stream and a second stream, wherein the first stream comprises said solid particulate material and exits the hydrocyclone separator via the first outlet and wherein the second stream comprises treatment liquor and solid waste fragments and exits the hydrocyclone separator via the second outlet; and (c) collecting the first stream after it exits the hydrocyclone separator via the first outlet.

It will be appreciated that the description hereinabove of the features of the method of the first aspect of the invention apply also to the second aspect of the invention.

The method of the second aspect may further comprise a step prior to transferring the recovered solid particulate material of recovering the solid particulate material from an effluent of the substrate treatment process in which said substrate had been treated with said solid particulate material and a treatment liquor, wherein the effluent comprises said solid particulate material, the treatment liquor and solid waste fragments derived from said substrate.

In a third aspect of the present invention, there is provided an apparatus for treating a substrate with a solid particulate material and a treatment liquor, the apparatus comprising:
- a rotatably mounted drum for containing the substrate, the solid particulate material and the treatment liquor;
- an opening in the rotatably mounted drum;
- a closure movable between a closed position at which the closure prevents the substrate, the solid particulate material, the treatment liquor and solid waste fragments derived from said substrate passing through the opening and an open position at which the substrate, the solid particulate material, the treatment liquor and the solid waste fragments can pass through the opening;
- a collection vessel configured to capture the substrate, the solid particulate material, the treatment liquor and the solid waste fragments that pass through the opening;
- a hydrocyclone separator comprising an inlet, a first outlet and a second outlet;
- a first flow pathway between the collection vessel and the hydrocyclone separator, wherein the substrate is unable to exit the collection vessel along the first flow pathway;
- a conveying means configured to convey effluent comprising the solid particulate material, the treatment liquor and the solid waste fragments along the first flow pathway to the inlet of the hydrocyclone separator;
- wherein the hydrocyclone separator is configured to separate the effluent to produce a first stream and a second stream, wherein the first stream comprises said solid particulate material and exits the hydrocyclone separator via the first outlet and wherein the second stream comprises treatment liquor and solid waste fragments and exits the hydrocyclone separator via the second outlet.

The apparatus of the third aspect is preferably an apparatus for treating a substrate with a solid particulate material and a treatment liquor according to the first aspect of the invention. It will be appreciated that the description hereinabove of the features of the method of the first aspect of the invention apply also to the third aspect of the invention.

Said conveying means is preferably a pump configured to convey said effluent along the first flow pathway to the inlet of the hydrocyclone separator.

In a first preferred embodiment, the apparatus further comprises a re-use pathway configured to return the first stream to a rotatably mounted drum in an apparatus for treating a substrate with a solid particulate material and a treatment liquor, said apparatus comprising said rotatably mounted drum for containing the substrate, the solid particulate material and the treatment liquor.

In a second preferred embodiment, the apparatus further comprising a recirculation pathway configured to recirculate the first stream into the hydrocyclone separator, preferably via said inlet. In this embodiment, the apparatus preferably further comprises means for combining said first stream with a liquid diluent prior to introduction of said first stream into the hydrocyclone separator, preferably wherein said liquid diluent is or comprises a recycled liquid stream derived from said second stream exiting the hydrocyclone separator and/or wherein said liquid diluent is or comprises a recycled liquid stream derived from a liquid effluent exiting a further cleaning stage of the solid particulate material. Preferably the apparatus of this embodiment further comprises collecting means configured to collect solid particulate material which has been recirculated at least once via said recirculation pathway, wherein said apparatus further comprises a re-use pathway configured to return said cleaned solid particulate material to a rotatably mounted drum in an apparatus for treating a substrate with a solid particulate material and a treatment liquor, said apparatus comprising said rotatably mounted drum for containing the substrate, the solid particulate material and the treatment liquor.

In a third preferred embodiment, the apparatus further comprises a first stream transfer pathway configured to transfer the first stream to a secondary cleaning apparatus which is configured to at least partially remove from said solid particulate material residual solid waste fragments derived from the substrate. In this embodiment, the secondary cleaning apparatus preferably comprises a secondary separator configured to allow water, said residual solid waste fragments and any treatment liquor and/or any liquid cleaning formulation to pass through the secondary separator, and wherein said secondary separator is configured to retain said solid particulate material on the surface of said secondary separator and further configured to:
  (i) direct a liquid cleaning formulation onto said solid particulate material whilst it is retained on the surface of said secondary separator; and/or
  (ii) agitate said solid particulate material whilst it is retained on the surface of said secondary separator.

In the third preferred embodiment, the secondary cleaning apparatus is preferably configured to agitate the solid particulate material on the secondary separator by vibrating the secondary separator or rotating the secondary separator or subjecting the secondary separator to a reciprocating motion or linear motion in a single direction, preferably wherein the secondary cleaning apparatus comprises a vibratory separator.

In the third preferred embodiment, the secondary separator is preferably associated with an access means configured to remove the solid particulate material which is unable to pass through the secondary separator.

In the third preferred embodiment, the apparatus preferably comprises a first recycle pathway configured to recycle secondary cleaning liquid effluent from the secondary cleaning apparatus to the hydrocyclone separator, preferably via said inlet, and preferably wherein said apparatus further comprises additional separating means (preferably the first fine grading separator referred to hereinabove) to remove some or all residual solid waste fragments from the secondary cleaning liquid effluent prior to recycling to the hydrocyclone separator.

In the third preferred embodiment, the apparatus preferably further comprises a first fine grading separator to remove some or all of the residual solid waste fragments from the secondary cleaning liquid effluent to provide a secondary cleaning filtrate stream, wherein the first fine grading separator is configured such that recycling of said secondary cleaning liquid effluent is effected after removal of some or all residual solid waste fragments from the secondary cleaning liquid effluent, such that the secondary cleaning liquid effluent is recycled as the secondary cleaning filtrate stream. Preferably, the first fine grading separator has apertures sized to allow liquid to pass through but prevents substantially all of said residual solid waste fragments from passing through. Preferably, the secondary separator and the first fine grading separator are comprised in a multilayer separating apparatus, wherein the multilayer separating apparatus is configured so that any material to be separated is exposed to the secondary separator before it is exposed to the first fine grading separator.

In the third preferred embodiment, the apparatus preferably further comprises a re-use pathway configured to return said cleaned solid particulate material to a rotatably mounted drum in an apparatus for treating a substrate with a solid particulate material and a treatment liquor, said apparatus comprising said rotatably mounted drum for containing the substrate, the solid particulate material and the treatment liquor.

The apparatus of the third aspect of the invention (and any of the preferred embodiments described herein above) preferably further comprises a second stream transfer pathway to transfer the second stream to a filtration apparatus that allows treatment liquor to pass through the filter but which prevents said solid waste fragments from passing through the filter, providing a first filtrate stream comprising treatment liquor and a first residue comprising said solid waste fragments. The apparatus preferably further comprises a first filtrate recycle pathway to recycle the first filtrate stream to the hydrocyclone separator, preferably via said inlet.

The apparatus of the third aspect of the invention (and any of the preferred embodiments described herein above) preferably further comprises a pre-treatment means to pre-treat the effluent prior to transferring the effluent to the hydrocyclone separator, wherein the pre-treatment means removes solid waste fragments of a size substantially larger than said solid particulate material. The pre-treatment means is preferably a coarse grading separator as described hereinabove The apparatus of the third aspect of the invention (and any of the preferred embodiments described herein above) preferably further comprises controlling means for controlling the ratio of solid particulate material:liquid in the stream fed into the hydrocyclone. Preferably, the controlling means comprises a flow regulator. The controlling means preferably comprises ducting to introduce a predetermined amount of a liquid diluent to the stream fed into the hydrocyclone, preferably wherein said liquid diluent is or comprises one or more recycled liquid stream(s) derived from said first stream and/or said second stream and/or wherein said liquid diluent is or comprises one or more recycled liquid stream(s) derived from any cleaning of the solid particulate material downstream of the hydrocyclone separator.

The apparatus is preferably suitable for treating a substrate which is an animal skin substrate, preferably a hide or pelt, and wherein said treating of the substrate is a tannery process.

The apparatus is preferably configured to separate said solid particulate material from solid waste fragments wherein the solid waste fragments derived from the substrate are fibrous and/or particulate.

The invention claimed is:

1. A method of treating a substrate with a solid particulate material and a treatment liquor comprising:
   agitating the substrate with said solid particulate material and said treatment liquor; and
   (a) separating the substrate from effluent comprising solid waste fragments derived from the substrate, said solid particulate material and the treatment liquor;
   (b) transferring said effluent to a hydrocyclone separator comprising an inlet, a first outlet and a second outlet, wherein the effluent is fed into the hydrocyclone separator via the inlet;
   (c) separating the effluent in the hydrocyclone separator to produce a first stream and a second stream, wherein the first stream comprises said solid particulate material and exits the hydrocyclone separator via the first outlet and wherein the second stream comprises treatment liquor and solid waste fragments and exits the hydrocyclone separator via the second outlet;
   (d) collecting the first stream after it exits the hydrocyclone separator via the first outlet; and
   (e) transferring the collected first stream to a secondary cleaning apparatus for further cleaning of the solid particulate material, wherein said cleaning removes from said solid particulate material some or substantially all of the residual solid waste fragments derived from the substrate.

2. The method of claim 1 wherein said first stream comprises said solid particulate material as a major fraction and further comprises a minor fraction which is treatment liquor, and wherein the first stream comprises at least 90% wt of said solid particulate material by total weight of the first stream.

3. The method of claim 1 wherein said first stream comprises said solid particulate material as a major fraction and further comprises a minor fraction which is residual solid waste fragments derived from the substrate, and wherein the first stream comprises at least 90% wt of said solid particulate material by total weight of the first stream.

4. The method of claim 1, further comprising re-using the collected first stream in a method of treating a substrate with solid particulate material and a treatment liquor.

5. The method of claim 1, further comprising recirculating the collected first stream into the hydrocyclone separator and repeating steps (c) and (d) one or more times, optionally wherein said first stream is combined with a liquid diluent prior to introduction of the first stream into the hydrocyclone separator such that where the recirculating of the first stream is conducted a plurality of times said first stream may be combined with said liquid diluent in each recirculation step or in only one or some of said recirculation steps.

6. The method of claim 1, wherein the secondary cleaning apparatus comprises a secondary separator configured to allow water, said residual solid waste fragments and any treatment liquor and/or any liquid cleaning formulation to pass through the secondary separator, and wherein cleaning of said solid particulate material comprises retaining said solid particulate material on the surface of said secondary separator and:
   (i) directing a liquid cleaning formulation onto said solid particulate material whilst it is retained on the surface of said secondary separator; and/or
   (ii) agitating said solid particulate material whilst it is retained on the surface of said secondary separator, optionally wherein the secondary separator is planar and comprises multiple apertures therein, the apertures of the secondary separator being sized such that the apertures are smaller than the smallest dimension of the solid particulate material.

7. The method of claim 6 wherein the secondary separator is substantially circular or elliptical; and/or
wherein the secondary separator is associated with an access means configured to remove the solid particulate material which is unable to pass through the secondary separator.

8. The method of claim 1, wherein the secondary cleaning apparatus provides cleaned solid particulate material and a secondary cleaning effluent and wherein the secondary cleaning effluent is a secondary cleaning liquid effluent the method further comprises the step of recycling said secondary cleaning liquid effluent to the hydrocyclone separator and/or to the secondary cleaning apparatus to further treat said solid particulate material, wherein said secondary cleaning liquid effluent may comprise any treatment liquor present in the first stream and/or any liquid cleaning formulation used in the secondary cleaning apparatus.

9. A method according to claim 8 wherein the step of recycling said secondary cleaning liquid effluent is effected after removal of some or all residual solid waste fragments from the secondary cleaning liquid effluent by passing the secondary cleaning liquid effluent through a first fine grading separator to remove some or all of the residual solid waste fragments from the secondary cleaning liquid effluent to provide a secondary cleaning filtrate stream, such that the secondary cleaning liquid effluent is recycled as the secondary cleaning filtrate stream;
and/or
wherein the secondary separator and the first fine grading separator are comprised in a multilayer separating apparatus, wherein the multilayer separating apparatus is configured so that any material to be separated is exposed to the secondary separator before it is exposed to the first fine grading separator.

10. The method of claim 1, further comprising re-using the cleaned solid particulate material in a method of treating a substrate with solid particulate material and a treatment liquor.

11. The method of claim 1, further comprising collecting the second stream after it exits the hydrocyclone separator via the second outlet and transferring the second stream to a filtration apparatus that allows treatment liquor to pass through the filtration apparatus but which prevents said solid waste fragments from passing through the filtration apparatus, providing a first filtrate stream comprising treatment liquor and a first residue comprising said solid waste fragments,
wherein said method further comprises recycling the first filtrate stream to the feed stream introduced to the hydrocyclone separator wherein the first filtrate stream is added to the feed stream prior to introduction of the feed stream into the hydrocyclone separator; and/or
wherein said filtration apparatus has a single filtration layer or has a plurality of filtration layers.

12. The method of claim 1, further comprising a step of pre-treating the effluent prior to transferring the effluent to the hydrocyclone separator, wherein the pre-treating of the effluent comprises removing solid waste fragments of a size substantially larger than said solid particulate material.

13. The method of claim 1 further comprising the step of controlling the ratio of solid particulate material:liquid in the hydrocyclone, herein the stream fed into the hydrocyclone has a solid particulate material:liquid ratio in the range of from about 1.0:0.1 to about 1.0:10.

14. The method of claim 1, wherein the substrate is an animal skin substrate or a textile fibre or fabric; and/or
wherein said method is a method of cleaning the substrate.

15. The method of claim 1, wherein the substrate is an animal skin substrate.

16. The method of claim 1, wherein the solid waste fragments derived from the substrate are fibrous and/or particulate.

17. The method of claim 1, wherein the solid particulate material comprises polymeric particles having a density of at least 1.0 g/cm$^3$ and no more than 8.0 g/cm$^3$; and/or
wherein the particles of the solid particulate material exhibit an average mass of from 1 mg to 3000 mg, and/or a surface area of from 10 mm$^2$ to 1000 mm$^2$, and/or an average volume in the range of from 5 to 500 mm$^3$, and/or an average particle diameter of from 1 mm to 200 mm, and/or a length of from 1 mm to 200 mm wherein said length is the maximum two-dimensional length of each three-dimensional solid particle.

18. The method of claim 1, wherein said effluent from step (a) is pumped from a collection vessel to the hydrocyclone separator.

19. The method of claim 1, wherein the first outlet is an underflow of the hydrocyclone separator and the second outlet is an overflow of the hydrocyclone separator.

20. The method of claim 13, wherein said liquid diluent is or comprises one or more recycled liquid stream(s) derived from said first stream and/or said second stream and/or wherein said liquid diluent is or comprises one or more recycled liquid stream(s) derived from any cleaning of the solid particulate material downstream of the hydrocyclone separator.

21. The method of claim 15, wherein the animal skin substrate is a hide or pelt.

22. The method of claim 15, wherein the method of treating the substrate is a tannery process, selected from colouring, curing, beamhouse treatments, pre-tanning, tanning, re-tanning, fat liquoring, enzyme treatment, tawing, crusting, dyeing and dye fixing, wherein said beamhouse treatments are selected from soaking, liming, deliming, reliming, unhairing, fleshing, bating, degreasing, scudding, bating, pickling and depickling.

23. A method of cleaning solid particulate material recovered from an animal skin substrate treatment process, in which said substrate had been treated with said solid particulate material and a treatment liquor, the method of cleaning the recovered solid particulate material comprising
(a) transferring effluent comprising solid waste fragments derived from the substrate, said solid particulate material and the treatment liquor to a hydrocyclone separator comprising an inlet, a first outlet and a second outlet, wherein the effluent is fed into the hydrocyclone separator via the inlet;
(b) separating the effluent in the hydrocyclone separator to produce a first stream and a second stream, wherein the first stream comprises said solid particulate material and exits the hydrocyclone separator via the first outlet and wherein the second stream comprises treatment liquor and solid waste fragments and exits the hydrocyclone separator via the second outlet; and
(c) collecting the first stream after it exits the hydrocyclone separator via the first outlet; and (d) transferring the collected first stream to a secondary cleaning apparatus for further cleaning of the solid particulate material, wherein said cleaning removes from said solid particulate material some or substantially all of the residual solid waste fragments derived from the substrate.

24. An apparatus for treating a substrate with a solid particulate material and a treatment liquor, the apparatus comprising:
a rotatably mounted drum for containing the substrate, the solid particulate material and the treatment liquor;
an opening in the rotatably mounted drum;
a closure moveable between a closed position at which the closure prevents the substrate, the solid particulate material, the treatment liquor and solid waste fragments derived from said substrate passing through the opening and an open position at which the substrate, the solid particulate material, the treatment liquor and the solid waste fragments can pass through the opening;
a collection vessel configured to capture the substrate, the solid particulate material, the treatment liquor and the solid waste fragments that pass through the opening;
a hydrocyclone separator comprising an inlet, a first outlet and a second outlet; a first flow pathway between the collection vessel and the hydrocyclone separator, wherein the substrate is unable to exit the collection vessel along the first flow pathway;
a conveying means configured to convey effluent comprising the solid particulate material, the treatment liquor and the solid waste fragments along the first flow pathway to the inlet of the hydrocyclone separator; and
a first stream transfer pathway configured to transfer the first stream to a secondary cleaning apparatus which is configured to remove from said solid particulate material some or substantially all of the residual solid waste fragments derived from the substrate,
wherein the hydrocyclone separator is configured to separate the effluent to produce a first stream and a second stream, wherein the first stream comprises said solid particulate material and exits the hydrocyclone separator via the first outlet and wherein the second stream comprises treatment liquor and solid waste fragments and exits the hydrocyclone separator via the second outlet.

25. The apparatus of claim 24 wherein said conveying means is a pump configured to convey said effluent along the first flow pathway to the inlet of the hydrocyclone separator; and/or
wherein said first stream comprises said solid particulate material as a major fraction and further comprises a minor fraction which is treatment liquor and/or a minor fraction which is residual solid waste fragments derived from the substrate.

26. The apparatus of claim 24 further comprising a re-use pathway configured to return the first stream to the rotatably mounted drum in the apparatus for treating a substrate with a solid particulate material and a treatment liquor, said apparatus comprising said rotatably mounted drum for containing the substrate, the solid particulate material and the treatment liquor.

27. The apparatus of claim 24, further comprising a recirculation pathway configured to recirculate the first stream into the hydrocyclone separator,
wherein the apparatus further comprises means for combining said first stream with a liquid diluent prior to introduction of said first stream into the hydrocyclone separator, wherein said liquid diluent is or comprises a recycled liquid stream derived from said second stream exiting the hydrocyclone separator and/or wherein said liquid diluent is or comprises a recycled liquid stream derived from a liquid effluent exiting a further cleaning stage of the solid particulate material.

28. The apparatus of claim 24, wherein the secondary cleaning apparatus comprises a secondary separator configured to allow water, said residual solid waste fragments and any treatment liquor and/or any liquid cleaning formulation to pass through the secondary separator, and wherein said secondary separator is configured to retain said solid particulate material on the surface of said secondary separator and further configured to:
(i) direct a liquid cleaning formulation onto said solid particulate material whilst it is retained on the surface of said secondary separator; and/or
(ii) agitate said solid particulate material whilst it is retained on the surface of said secondary separator,
wherein the secondary separator is planar and comprises multiple apertures therein, the apertures of the secondary separator being sized such that the apertures are smaller than the smallest dimension of the solid particulate material, wherein the secondary separator is a non-woven mesh or perforated sheet.

29. The apparatus of claim 28 configured to agitate the solid particulate material on the secondary separator by vibrating the secondary separator or rotating the secondary separator or subjecting the secondary separator to a reciprocating motion or linear motion in a single direction.

30. The apparatus of claim 28 wherein the secondary separator is associated with an access means configured to remove the solid particulate material which is unable to pass through the secondary separator.

31. The apparatus of claim 24, wherein the apparatus comprises a first recycle pathway configured to recycle secondary cleaning liquid effluent from the secondary cleaning apparatus to the hydrocyclone separator and/or to the secondary cleaning apparatus to further treat said solid particulate material,
and wherein the apparatus further comprises a first fine grading separator to remove some or all of the residual solid waste fragments from the secondary cleaning liquid effluent to provide a secondary cleaning filtrate stream, wherein the first fine grading separator is configured such that recycling of said secondary cleaning liquid effluent is effected after removal of some or all residual solid waste fragments from the secondary cleaning liquid effluent, such that the secondary cleaning liquid effluent is recycled as the secondary cleaning filtrate stream.

32. The apparatus of claim 31 wherein the secondary separator and the first fine grading separator are comprised in a multilayer separating apparatus, wherein the multilayer separating apparatus is configured so that any material to be separated is exposed to the secondary separator before it is exposed to the first fine grading separator.

33. The apparatus of claim 24, wherein said apparatus further comprises a re-use pathway configured to return said cleaned solid particulate material to the rotatably mounted drum in the apparatus for treating a substrate with a solid particulate material and a treatment liquor, said apparatus comprising said rotatably mounted drum for containing the substrate, the solid particulate material and the treatment liquor.

34. The apparatus of claim 24, further comprising a second stream transfer pathway to transfer the second stream to a filtration apparatus that allows treatment liquor to pass through the filtration apparatus but which prevents said solid waste fragments from passing through the filtration apparatus, providing a first filtrate stream comprising treatment liquor and a first residue comprising said solid waste fragments, and     wherein the apparatus further comprises a first filtrate recycle pathway to recycle the first filtrate stream to the hydrocyclone separator via said inlet; and/or     wherein said filtration apparatus is selected from single layered or multi-layered sieves or filters, optionally wherein the filtration apparatus is or comprises a self-cleaning filter.

35. The apparatus of claim 24, further comprising a pre-treatment means to pre-treat the effluent prior to transferring the effluent to the hydrocyclone separator, wherein the pre-treatment means removes solid waste fragments of a size substantially larger than said solid particulate material,     wherein said pre-treatment means is a coarse grading separator configured to allow said solid particulate material to pass through said coarse grading separator but to prevent material of a size substantially larger than said solid particulate material from passing through.

36. The apparatus of claim 24 further comprising controlling means for controlling the ratio of solid particulate material:liquid in the stream fed into the hydrocyclone,     wherein the controlling means comprises a flow regulator; and/or     wherein the controlling means comprises ducting to introduce a predetermined amount of a liquid diluent to the stream fed into the hydrocyclone, wherein said liquid diluent is or comprises one or more recycled liquid stream(s) derived from said first stream and/or said second stream and/or wherein said liquid diluent is or comprises one or more recycled liquid stream(s) derived from any cleaning of the solid particulate material downstream of the hydrocyclone separator.

37. The apparatus of claim 24 which is configured to separate said solid particulate material from solid waste fragments wherein the solid waste fragments derived from the substrate are fibrous and/or particulate; and/or     wherein said apparatus is suitable for treating a substrate with a solid particulate material comprises polymeric particles having a density in the range of from 1.5 to 2.5 g/cm$^3$.

38. The apparatus of claim 24, wherein the first outlet is an underflow of the hydrocyclone separator and the second outlet is an overflow of the hydrocyclone separator.

* * * * *